United States Patent [19]

Campbell et al.

[11] Patent Number: 4,734,596
[45] Date of Patent: Mar. 29, 1988

[54] DETECTION OF DIRECT CURRENT IN THE PRESENCE OF MANCHESTER-ENCODED SIGNALS

[75] Inventors: David L. Campbell, Sunnyvale; Ravindra D. Tembhekar, Santa Clara, both of Calif.

[73] Assignee: Advanced Micro Devices, Inc., Sunnyvale, Calif.

[21] Appl. No.: 847,805

[22] Filed: Apr. 3, 1986

[51] Int. Cl.[4] ............................................. H03K 5/153
[52] U.S. Cl. ................................... 307/350; 307/354; 307/362; 328/167
[58] Field of Search ....................... 307/350, 354, 362; 328/150, 162, 165, 167

[56] References Cited

U.S. PATENT DOCUMENTS 4,308,502 12/1981 Brolin .................................. 307/350
4,572,965 2/1986 Yamamura ........................... 307/350

OTHER PUBLICATIONS

V. A. Shadden, "Reference Feedback Circuit for Phase-Modulated Signal Demodulation", IBM Technical Disclosure Bulletin, vol. 17, No. 11, Apr. 1975, pp. 3319-3320.

Primary Examiner—John Zazworsky
Attorney, Agent, or Firm—Patrick T. King; Kenneth B. Salomon; J. Vincent Tortolano

[57] ABSTRACT

Method and apparatus suitable for inclusion in an integrated circuit transceiver meeting IEEE 802.3 standards which detects "collisions" so that more than one station will not simultaneously transmit over a network. The method employs a novel three-pole cyclical low-pass filter which attenuates the ac component received over the network to less than 20 mV to allow collision detection within the 900 nanosecond budget allowed by the IEEE standard. A differential operational amplifier receives the signal from the network and a collision reference voltage. The signal generated by the differential amplifier is filtered by the low-pass filter and then coupled to a high-gain comparator which acts as a zero-crossing detector. The comparator generates ECL logic signals representing the occurrence or non-occurrence of a collision. The resulting collision detector operates over a wide range without the need for field "trimming".

3 Claims, 2 Drawing Figures

DETECTION OF DIRECT CURRENT IN THE PRESENCE OF MANCHESTER-ENCODED SIGNALS

This invention relates to high-frequency data transmission over a network and, more particularly, to a method and apparatus for the detection of a direct current voltage in the presence of a high frequency data stream so as to avoid "collisions", i.e., the presence of more than one station attempting to transmit data simultaneously on the network.

BACKGROUND OF THE INVENTION

A set of standards have been promulgated by the Institute of Electrical and Electronic Engineers (IEEE) which specify the port characteristics for a coaxial media interface to Data Terminal Equipment (DTE). The IEEE 802.3 Local Area Network Standard employs a "collision detection" method to indicate the presence of more than one station attempting to transmit data simultaneously on the network.

The transmitted data "packet" is composed of both alternating current (AC) and direct current (DC) components. When two or more stations try to transmit data at the same time, the data packets will be corrupted. For example, the AC signal on the coaxial medium can vary a great deal, and may even phase cancel, depending upon the phase relation and the bit pattern. However, the DC component will always be additive. It is this shift in the DC value that is used to indicate the presence of a collision on the network.

The IEEE 802.3 standard makes certain recommendations for the "no detect" and "must detect" levels on the network. They are based on calculations made for both 10 Base 5—Ethernet and 10 Base 2—Cheapernet specifications, namely a 5 ohm DC loop resistance and a 10 ohm DC loop system, respectively. For longer networks the DC loop resistances are larger than these values and the collision detect window shrinks until it is impossible to distinguish the two conditions. These considerations lead to a 150 millivolt (mV) to 200 mV collision detect window.

In addition, the IEEE 802.3 standard requires that a collision indication should occur within nine bit times of the actual collision on the coaxial medium. For a 10 megabit per second (Mbps) data stream this is 900 nanoseconds (ns). For a collision detection circuit, which will include a low-pass filter and logic gates, the total delay in the collision detect path must not exceed 900 ns, which places a premium on limiting low-pass filter response and gate delays. The AC component of the signal in which the collision detection circuit must operate is approximately 2 volts peak-to-peak at 10 Mbps.

The characteristics of the collision detection circuit then are:

(1) it shall provide large attenuation to the 10 Mbps data, i.e., ripple must be well controlled;

(2) it shall meet the delay requirements;

(3) it shall *not* indicate a false collision in the presence of only one transmitting station, i.e., its step response must not have appreciable overshoot;

(4) it should meet the IEEE collision detection standards over a normal range of variation in circuit component parameters, as such parameters vary due to process and temperature.

The prior art has employed discrete components, such as inductors, that require careful trimming adjustments in the field. Furthermore, individual component values were difficult to control when constructing the circuitry out of discrete components, and component matching was difficult to achieve. This made such circuits highly sensitive to parameter variation.

SUMMARY OF THE INVENTION

A collision detection method which is suitable for implementation is an integrated circuit package, is provided which eliminates the need for field adjustments. The apparatus implementing the collision detection method works over a wide temperature range and the manufacturing process employed in integrated circuits permits rigid control over the individual component parameters.

The method involves comparison of the signal received over the network with a collision reference voltage Vcol. The resulting difference signal is passed through a three-pole cyclical (synchronously-tuned) low-pass filter. The output signal from the filter is coupled to a high-gain comparator which acts as a zero-crossing detector. The comparator generates ECL logic signals representing occurrence and non-occurrence of a collision. These signals are conducted to two time-delay generators, performing 100 ns and 200 ns delays, respectively, and their output signals provide the set and reset input signals, respectively, to an S-R latch. The delay generators act as pulse-width discriminators for LOW-going pulses. The latch, in conjunction with the delay generators, prevents toggling between the collision and no-collision states, in the presence of large transient signals which may occur at the near-end of the network.

The time-delay generators eliminate any uncertainty in the detection of collisions due to the residual ripple after the signal has passed through the three-pole low-pass filter. The low-pass filter is a three-pole cascaded cyclic (synchronously-tuned) RC filter which is simple to realize and has poles at the same location on the real axis. Consequently, it does not have any overshoot in its step response and thereby avoids false detection of collisions. It also provides the minimum delay for a real-pole implementation.

Elimination of inductances in the low-pass filter allows the collision detection apparatus to be implemented as part of an integrated circuit. Since the filter employs three fully-isolated stages, there is no filter section interaction. The collision detection apparatus operates in a differential mode and is DC-balanced at the voltage of interest, namely the collision reference voltage Vcol. As a result, the collision detection apparatus is independent of filter stage gain.

DETAILED DESCRIPTION OF A PREFERRED EMBODIMENT

Figure 1:
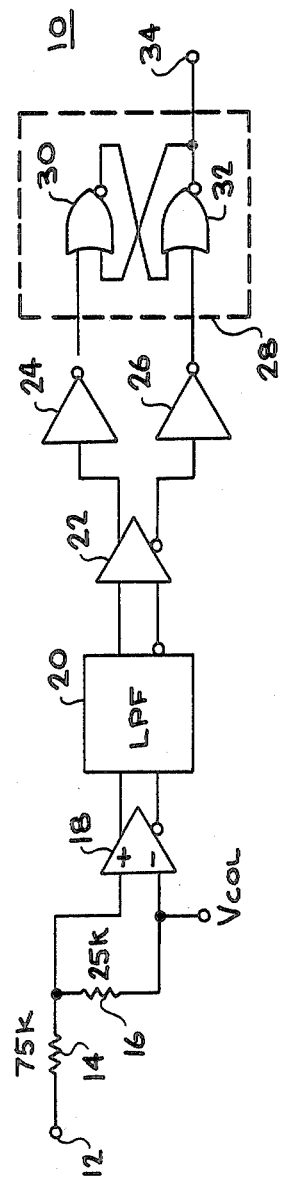
FIG. 1 is a block diagram of the collision detection device of the instant invention.

With reference to FIG. 1, a collision detection device 10 of the instant invention is illustrated in block diagram form. The signal received from the network over "tap" 12 is conducted via a 4:1 attenuation network consisting of a 75 kilo ohm (Kohm) resistor 14 and a 25 Kohm resistor 16. The attenuated signal across resistor 16 is applied to the input terminals of a differential operational amplifier 18. The negative terminal of operational amplifier 18 also receives a collision reference voltage (Vcol).

The resulting difference signal generated at the differential output terminals of operational amplifier 18 are conducted to a low-pass filter (LPF) 20. Filter 20 attenuates the AC component of the difference signal to approximately 20 mV for a 2 volt AC component appearing at the tap 12. The design of the low-pass filter 20 will be described hereinbelow in connection with FIG. 2.

The filtered signals generated by LPF 20 are conducted to a comparator 22 which operates as a differential zero-crossing device. Comparator 22 generates emitter-coupled logic (ECL) signals at a true and at a complement output terminal. A LOW logic signal at the true output is indicative of a collision and a LOW logic signal at the complement output indicative of no collision.

The signal at the true output terminal of comparator 22 is conducted to a 100 nsec delay generator 24. The signal at the complemented output terminal of comparator 22 is conducted to a 200 nsec delay generator 26. These delay generators generate signals conducted to a set-reset (S-R) latch 28 comprising a pair of NOR gates 30 and 32. A HIGH logic signal generated by S-R latch 28 at a terminal 34 is indicative of the detection of a collision.

The 100 nsec delay generator 24 detects a LOW pulse-width during the preamble portion of a data packet; a 5 MHz signal having a 50% duty cycle produces a LOW-going pulse of 100 nsec duration. This detection causes S-R latch 28 to be set. The 200 nsec delay generator 26, receiving the complemented output of comparator 22, serves to reset S-R latch 28, since a HIGH-going pulse of 200 nsec duration indicates the end of a valid packet. Accordingly, a collision condition has ceased to exist.

With regard to the elements shown in FIG. 1, all but the low-pass filter (LPF) 20 and the delay generators 24 and 26 are conventional in design, as will be appreciated by those skilled in the art, and accordingly will not be described in detail herein. The LPF 20 is of a three-pole cyclical, or synchronously-tuned, design. It employs RC filtering and is particularly suited for inclusion in an integrated-circuit package since it does not employ inductors as do the prior art discrete circuit devices, and because of the manufacturing process used for integrated circuits, the component values may be closely controlled so that trimming is unnecessary. The LPF 20 has each of its poles at 1.8 MHz to filter 5 MHz AC components.

The delay generators 24 and 26 are preferably of a type suitable for use in integrated circuits. One such time-delay device is described in a copending patent application "An Interruptable Voltage-Controlled Oscillator" filed Aug. 5, 1983 on behalf of Dave Campbell, U.S. Ser. No. 520,876 which description is incorporated herein by reference.

Figure 2:
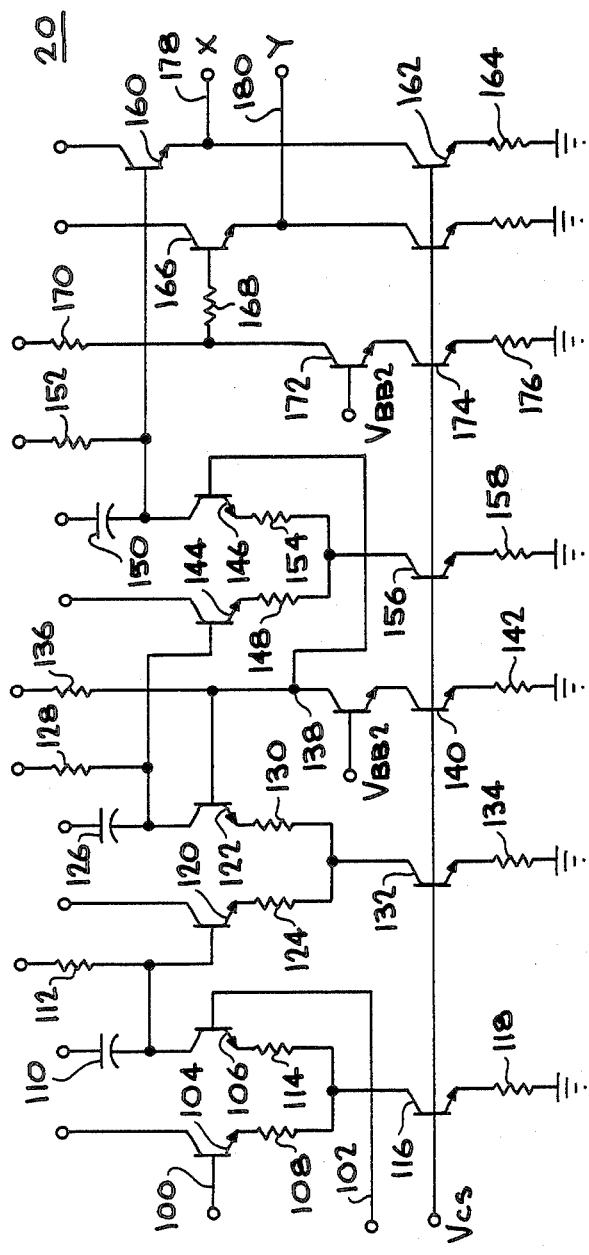
FIG. 2 is a schematic diagram of the low-pass filter employed within the collision detection device.

FIG. 2 is a schematic diagram of the LPF 20 employed in the collison detection device 10 of the instant invention. Three separate single-ended stages are employed within LPF 20, rather than differential stages so as to minimize the number of components required by the LPF. Furthermore, differential stages could potentially saturate if employed in the collision detection device 10 and accordingly would not conduct signals properly. At last, fourth, stage of LPF 20 produces a buffered pseudo-differential signal at the output terminals of LPF 20 for use by the remaining elements 22, 24, 26 and 28 of the collision detector of FIG. 1.

The signals generated by differential operational amplifier 18 are received at terminals 100 and 102 of LPF 20 and conducted to the base of NPN transistors 104 and 106, respectively, of the first stage of LPF 20. The collector of transistor 104 is connected to a source of positive voltage and its emitter is connected to a first lead of a resistor 108. The collector of transistor 106 is AC-coupled to the source of positive voltage via a capacitor 110 and DC-coupled via a resistor 112. The emitter of transistor 106 is connected to a first lead of a resistor 114.

The second leads of resistors 108 and 114 are connected in common and to the collector of an NPN transistor 116. The emitter of transistor 116 is coupled to ground via a resistor 118 and its base is connected to a soruce of bias voltage Vcs.

The transistors 104, 106 and 118, and related passive elements, form the first stage of LPF 20. The values of resistor 112 and capacitor 110 determine the RC-filter constant and pole position corresponding to the first stage. In one application, these components have values of 16 kilo ohm (Kohm) and 5.5 picofarads (pf), giving an RC value of $88 \times 10^{-9}$ corresponding to a corner frequency of 1.8 MHz.

The second stage of LPF 20 is of similar construction to that of the first stage and will accordingly not be described in detail except to note that it receives the signal generated by the first stage at the base of a transistor 120 (corresponding to transistor 104 in the first stage) connected to the collector of transistor 106, and that the base of the transistor 122 (corresponding to transistor 106) is connected to a source of bias voltage comprising a series connection of a resistor 136, NPN transistors 138 and 140, and a resistor 142, a first lead of resistor 136 connected to the positive voltage source and a second lead of resistor 142 connected to ground. The base of transistor 138 is connected to a source of bias voltage VBB2 and the base of transistor 140 to the source of bias voltage Vcs. Thus the second stage of LPF 20 is operated in a single-ended mode.

Similarly, a third stage of LPF 20 identical in construction to that of the second stage sharing the source of bias voltage comprising elements 136, 138, 140 and 142 receives the signal generated by the second stage and generates therefrom a signal conducted to the fourth stage of LPF20. The fourth stage includes an NPN transistor 160 receiving at its base the signal generated by the third stage. The collector of transistor 160 is connected to the source of positive voltage and its emitter is connected to ground via an NPN transistor 162 and resistor 164. The base of transistor 162 is connected to the source of bias voltage Vcs. The signal at the emitter of transistor 160 is one of the pair of signals generated by LPF 20 and conducted to comparator 22. The second of this pair of signals is generated at the emitter of an NPN transistor 166 which has its collector connected to the source of positive voltage, its base connected via a resistor 168 to a source of bias voltage comprising a series connection of a resistor 170, NPN transistors 172 and 174, and a resistor 176, connected to the positive voltage source, the source of bias voltages VBB2 and Vcs, and ground, similarly to that of the bias voltage source shared by stages two and three of the LPF 20. The signal generated at the emitters of transistors 160 and 166 and conducted to terminals 178 and 180 is thus a balanced matched output signal.

The combination of three isolated, but identically-positioned RC poles, each at 1.8 MHz, results in a cyclical filter with a 0 to 95% step response equal to six times the RC-filter constant value of 88 nsec, or 528 nsec in this embodiment. The LPF 20 attentuates the AC component of the nominal signal applied at the tap 12 to approximately 20 mV, while producing a signal at terminals 178 and 180 indicative of the presence or absence of a DC component in the signal applied at tap 12 exceeding the collision reference voltage Vcol. To achieve this attenuation with a single-pole filter would require an RC-filter constant of 820 nsec resulting in a 10% to 90% step response of 1800 nsec and would greatly exceed the 900 nsec delay specified by the IEEE 802.3 standard.

Furthermore, the LPF 20 does not overshoot in its step response because of its implementation with real poles. As a result, detection of "false" collisions is eliminated.

We claim:

1. A method for detection of a direct current (DC) component exceeding a predetermined voltage ("collision") on a single-ended signal line also having an alternating current (AC) component, comprising the steps:
   (a) generating a signal representing the difference between a signal on said signal line and said predetermined voltage;
   (b) removing said AC component from said difference signal by filtering;
   (c) comparing said filtered signal against a zero-level and generating an occurrence signal and a non-occurrence signal having first predetermined values, respectively, if said DC component exceeds said predetermined voltage and having second predetermined values, respectively, otherwise;
   (d) delaying said occurrence and non-occurrence signals by a first and a second predetermined amount, respectively, resulting in pulse-width discrimination of said signal generated at step (a); and
   (e) applying said occurrence and non-occurrence signals delayed by said first predetermined amount and said second predetermined amount, to a set and a reset input of a S-R latch, respectively, the state of said S-R latch indicating the detection or non-detection of said DC component exceeding said predetermined voltage.

2. In an integrated circuit device detecting a direct current (DC) component exceeding a predetermined voltage on a single-ended signal line ("a collision") also having an alternating current (AC) component, said device including means for generating a signal representing the difference between the signal on said signal line and said predetermined voltage, said device further including a low-pass filter receiving said difference signal and removing said ac component therefrom said low-pass filter comprising:
   a differential input stage receiving said difference signal;
   a plurality of single-ended filter stages, a first of which is responsive to the signal generated by said input stage, each constituting an RC-filter section, each responsive to the RC-filtered signal generated by its predecessor;
   an output stage, responsive to the RC-filtered signal generated by the last of said plurality of single-ended filter stages.

3. In an integrated circuit device according to claim 2 wherein all of said plurality of single-ended RC-filter stages of said low-pass filter have identical RC pole locations.

* * * * *